(12) United States Patent
Honda et al.

(10) Patent No.: US 9,852,898 B2
(45) Date of Patent: Dec. 26, 2017

(54) TARGET FOR ULTRAVIOLET LIGHT GENERATION, ELECTRON BEAM-EXCITED ULTRAVIOLET LIGHT SOURCE, AND PRODUCTION METHOD FOR TARGET FOR ULTRAVIOLET LIGHT GENERATION

(71) Applicant: HAMAMATSU PHOTONICS K.K., Hamamatsu-shi, Shizuoka (JP)

(72) Inventors: Yoshinori Honda, Hamamatsu (JP); Hiroyuki Taketomi, Hamamatsu (JP); Fumitsugu Fukuyo, Hamamatsu (JP); Koji Kawai, Hamamatsu (JP); Hidetsugu Takaoka, Hamamatsu (JP); Takashi Suzuki, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 307 days.

(21) Appl. No.: 14/437,345

(22) PCT Filed: Sep. 6, 2013

(86) PCT No.: PCT/JP2013/074136
§ 371 (c)(1),
(2) Date: Apr. 21, 2015

(87) PCT Pub. No.: WO2014/065030
PCT Pub. Date: May 1, 2014

(65) Prior Publication Data
US 2015/0270116 A1    Sep. 24, 2015

(30) Foreign Application Priority Data
Oct. 23, 2012 (JP) .................. 2012-233978

(51) Int. Cl.
H01J 63/06 (2006.01)
H01J 63/04 (2006.01)
C09K 11/77 (2006.01)

(52) U.S. Cl.
CPC .......... H01J 63/06 (2013.01); C09K 11/7774 (2013.01); H01J 63/04 (2013.01)

(58) Field of Classification Search
None
See application file for complete search history.

(56) References Cited

U.S. PATENT DOCUMENTS 5,846,638 A * 12/1998 Meissner ................ B32B 17/00
                                                          117/1
5,851,428 A * 12/1998 Matsuda ............ C09K 11/7701
                                                       252/301.4 F (Continued)

FOREIGN PATENT DOCUMENTS

CN      1893976      1/2007
CN    101084329     12/2007

(Continued)

OTHER PUBLICATIONS

Zorenko et al. "Growth and luminescent properties of Lu2SiO5 and Lu2SiO5:Ce single crystalline films" IOP Conf. Series: Materials Science and Engineering 15, 2010, Jan. 2010.*

(Continued)

*Primary Examiner* — Robert S Loewe
(74) *Attorney, Agent, or Firm* — Drinker Biddle & Reath LLP

(57) ABSTRACT

A target for ultraviolet light generation comprises a substrate adapted to transmit ultraviolet light therethrough and a light-emitting layer, disposed on the substrate, for generating ultraviolet light in response to an electron beam. The light-emitting layer includes a powdery or granular oxide (Continued)

crystal containing Lu and Si doped with an activator (e.g., Pr:LPS and Pr:LSO crystals).

8 Claims, 12 Drawing Sheets

(56) References Cited

U.S. PATENT DOCUMENTS

| | | | | |
|---|---|---|---|---|
| 6,812,361 | B2* | 11/2004 | Kammel | C07F 7/1892 |
| | | | | 556/414 |
| 7,825,243 | B2* | 11/2010 | Childress | C07F 7/1892 |
| | | | | 544/193 |
| 8,895,947 | B2* | 11/2014 | Honda | C09K 11/7766 |
| | | | | 250/365 |
| 9,240,313 | B2* | 1/2016 | Honda | H01J 63/06 |
| 9,318,312 | B2* | 4/2016 | Honda | H01J 63/02 |
| 2003/0173542 | A1 | 9/2003 | Fukuta et al. | |
| 2004/0245479 | A1* | 12/2004 | Misawa | C09K 11/7774 |
| | | | | 250/484.4 |
| 2010/0289435 | A1* | 11/2010 | Kita | C09K 11/0883 |
| | | | | 315/363 |

FOREIGN PATENT DOCUMENTS

| | | |
|---|---|---|
| CN | 101842869 | 9/2010 |
| EP | 1 816 241 | 8/2007 |
| JP | S51-059079 | 5/1976 |
| JP | H02-225587 A | 9/1990 |
| JP | H8-285947 | 11/1996 |
| JP | 2002-033080 | 1/2002 |
| JP | 2006-520836 A | 9/2006 |
| JP | 2007-294698 | 11/2007 |
| JP | 2009-120809 | 6/2009 |
| JP | 2012-123960 | 6/2012 |
| JP | 2013-053257 A | 3/2013 |
| JP | 2013-187067 | 9/2013 |
| JP | 2013-535527 | 9/2013 |
| WO | WO 03/005405 | 1/2003 |
| WO | WO 2004/019059 | 3/2004 |
| WO | WO-2006/049284 A1 | 5/2006 |
| WO | WO 2009/138682 | 11/2009 |
| WO | WO-2012/006774 A1 | 1/2012 |
| WO | WO-2012/147744 A1 | 11/2012 |

OTHER PUBLICATIONS

E. van der Kolk et al., "5d electron delocalization of Ce3+ and Pr3+ in Y2SiO5 and Lu2SiO5", Physical Review B 71, 2005, p. 165120-1, p. 165120-6.

A. Novoselov, et al., "Study on Crystal Growth and Luminescence Properiies of Pr-doped RE$_2$SiO$_5$ (Re=Y. Lu)", Journal of Crystal Growth, vol. 287, No. 2, Dec. 27, 2005, pp. 309-332.

F. He, et al., "Optical and Thermoluminescence Properties of Lu$_2$Si$_2$O$_7$: Pr Single Crystal," Journal of Rare Earths, vol. 30, No. 8, Aug. 31, 2012, pp. 775-779.

L. Pidol et al., "Scintillation properties of Lu$_2$Si$_2$O$_7$:Ce$^{3+}$, a fast and efficient scintillator crystal," Journal of Physics: Condensed Matter, 2003, pp. 2091-2102, vol. 15.

International Preliminary Report on Patentability dated Apr. 28, 2015 for PCT/JP2013/074136.

Nikl, M., et al., "Fast 5d→4f luminescence of Pr$^{3+}$ in Lu$_2$SiO$_5$ single crystal host", Chemical Physics Letters, vol. 410, No. 4-6, Jul. 20, 2005, pp. 218-221, XP027648249.

* cited by examiner (a)

(b)

(a)

(b)

(a)

(b)

(a)

(b)

(a)

(b)

(a)

(b)

TARGET FOR ULTRAVIOLET LIGHT GENERATION, ELECTRON BEAM-EXCITED ULTRAVIOLET LIGHT SOURCE, AND PRODUCTION METHOD FOR TARGET FOR ULTRAVIOLET LIGHT GENERATION

TECHNICAL FIELD

One aspect of the present invention relates to a target for ultraviolet light generation, an electron-beam-excited ultraviolet light source, and a method for manufacturing a target for ultraviolet light generation.

BACKGROUND ART

Patent Literature 1 describes the use of a single crystal containing praseodymium (Pr) as a material for a scintillator employed in PET devices. Patent Literature 2 discloses a technique concerning an illumination system in which a wavelength of light emitted from a light-emitting diode is converted by a phosphor so as to attain white light.

CITATION LIST

Patent Literature

Patent Literature 1: International Publication No. 2006/049284 pamphlet
Patent Literature 2: Japanese Translated International Application Laid-Open No. 2006-520836

SUMMARY OF INVENTION

Technical Problem

Electron tubes such as mercury-xenon lamps and deuterium lamps have conventionally been used as ultraviolet light sources. However, these ultraviolet light sources are low in light emission efficiency and large in size and have problems in terms of stability and life. When a mercury-xenon lamp is used, there is a fear of mercury affecting the environment. On the other hand, electron-beam-excited ultraviolet light sources equipped with a structure for exciting ultraviolet light by irradiating a target with an electron beam have been known as another type of ultraviolet light sources. The electron-beam-excited ultraviolet light sources are expected to become light sources in the field of optical measurement taking advantage of their high stability, for sterilization and disinfection making use of their low power consumption, or for medical care and biochemistry utilizing their high wavelength selectivity. The electron-beam-excited ultraviolet light sources also have a merit that their power consumption is lower than that of mercury lamps and the like.

Light-emitting diodes which can output light in the ultraviolet region such as one having a wavelength of 360 nm or shorter have recently been developed. However, such light-emitting diodes still have low output light intensity and are hard to increase their light-emitting area, thus leaving a problem that their uses are limited. By contrast, the electron-beam-excited ultraviolet light sources can generate ultraviolet light with sufficient intensity and are able to output ultraviolet light having uniform intensity with a large area by increasing the diameter of the electron beam irradiating the target.

However, the electron-beam-excited ultraviolet light sources are also demanded to improve their ultraviolet light generation efficiency further. It is an object of one aspect of the present invention to provide a target for ultraviolet light generation, an electron-beam-excited ultraviolet light source, and a method for manufacturing a target for ultraviolet light generation, which can enhance the ultraviolet light generation efficiency.

Solution to Problem

For solving the problems mentioned above, the target for ultraviolet light generation in accordance with one aspect of the present invention comprises a substrate adapted to transmit ultraviolet light therethrough and a light-emitting layer disposed on the substrate and generating ultraviolet light in response to an electron beam, the light-emitting layer including a powdery or granular oxide crystal containing Lu and Si doped with an activator.

The inventors thought of using an oxide crystal containing Lu and Si doped with an activator, examples of which include $(Pr_xLu_{1-x})_2SiO_2O_7$ (Pr:LPS, where $0<x<1$) and $(Pr_xLu_{1-x})_2SiO_5$ (Pr:LSO, where $0<x<1$), as a target for ultraviolet light generation. However, it has turned out that the methods described in the prior art literature are hard to yield sufficient ultraviolet light generation efficiency. In contrast, as a result of tests and studies conducted by the inventors, it has been found that the ultraviolet light generation efficiency can remarkably be enhanced when an oxide crystal containing Lu and Si doped with an activator is turned into a powdery or granular form and then shaped into a film. That is, the target for ultraviolet light generation in accordance with one aspect of the present invention has a light-emitting layer including a powdery or granular oxide crystal containing Lu and Si doped with an activator and thus can effectively enhance the ultraviolet light generation efficiency.

In the target for ultraviolet light generation, the oxide crystal may have a surface covered with a melted crystal layer resolidified after being melted by heat treatment. This fuses oxide crystals to each other and to the substrate, so as to enable the light-emitting layer to attain sufficient mechanical strength without using binders, while enhancing the bonding strength between the light-emitting layer and substrate, whereby the light-emitting layer can be restrained from peeling.

In the target for ultraviolet light generation, the oxide crystal may contain at least one of LPS and LSO.

In the target for ultraviolet light generation, the activator may be Pr.

In the target for ultraviolet light generation, the substrate may be constituted by sapphire, silica, or rock crystal. This enables the substrate to transmit ultraviolet light therethrough and endure the temperature of heat treatment of the light-emitting layer if any.

The electron-beam-excited ultraviolet light source in accordance with one aspect of the present invention comprises any of the targets for ultraviolet light generation mentioned above and an electron source providing the target with the electron beam. This electron-beam-excited ultraviolet light source can enhance the ultraviolet light generation efficiency by having any of the targets for ultraviolet light generation mentioned above.

The method for manufacturing a target for ultraviolet light generation in accordance with one aspect of the present invention comprises depositing a powdery or granular oxide crystal containing Lu and Si doped with an activator on a substrate adapted to transmit ultraviolet light therethrough and heat-treating the oxide crystal, so as to melt and then resolidify a surface of the oxide crystal to form a melted crystal layer. According to this method for manufacturing a target for ultraviolet light generation, the melted crystal layer fuses oxide crystals to each other and to the substrate, so as to enable the light-emitting layer to attain sufficient mechanical strength without using binders, while enhancing the bonding strength between the light-emitting layer and substrate, whereby the light-emitting layer can be restrained from peeling. In this manufacturing method, the heat-treatment temperature may be at least 1000° C. but not higher than 2000° C.

Advantageous Effects of Invention

The target for ultraviolet light generation, electron-beam-excited ultraviolet light source, and method for manufacturing a target for ultraviolet light generation in accordance with one aspect of the present invention can enhance the ultraviolet light generation efficiency.

DESCRIPTION OF EMBODIMENTS

In the following, embodiments of the target for ultraviolet light generation, electron-beam-excited ultraviolet light source, and method for manufacturing a target for ultraviolet light generation in accordance with one aspect of the present invention will be explained in detail with reference to the drawings. In the explanation of the drawings, the same constituents will be referred to with the same signs while omitting their overlapping descriptions.

Figure 1:
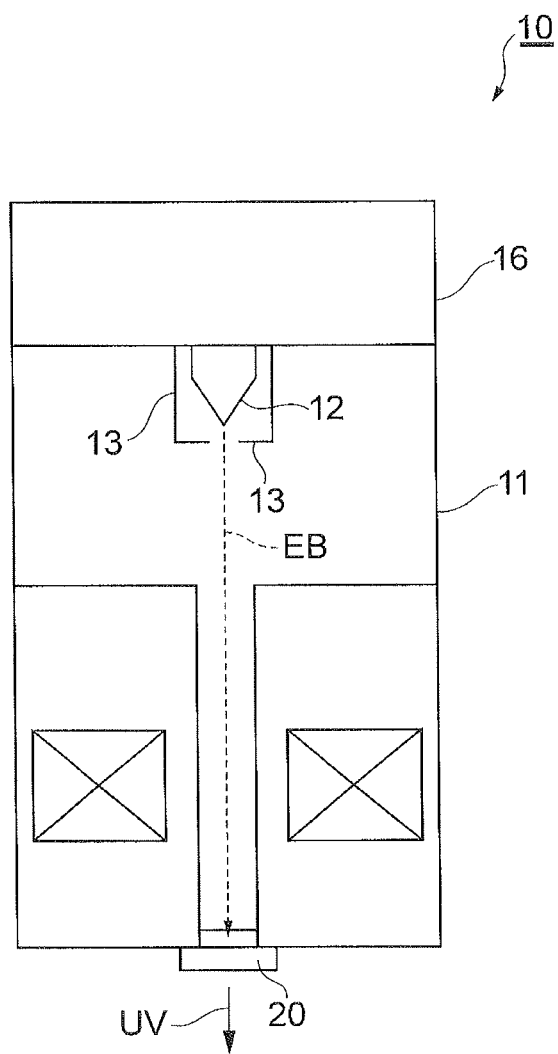
FIG. 1 is a schematic view illustrating an inner structure of the electron-beam-excited ultraviolet light source in accordance with an embodiment.

FIG. 1 is a schematic view illustrating an inner structure of an electron-beam-excited ultraviolet light source 10 in accordance with an embodiment. In this electron-beam-excited ultraviolet light source 10, as illustrated in FIG. 1, an electron source 12 and an extraction electrode 13 are arranged on the upper end side within a glass envelope (electron tube) 11 evacuated under vacuum. When an appropriate extraction voltage is applied between the electron source 12 and extraction electrode 13 from a power supply part 16, an electron beam EB accelerated by a high voltage is emitted from the electron source 12. As the electron source 12, one emitting an electron beam having a large area (e.g., cold cathodes such as carbon nanotubes or hot cathodes) can be used.

A target 20 for ultraviolet light generation is arranged on the lower end side within the envelope 11. The target 20 is set to the ground potential, for example, while a high negative voltage is applied from the power supply part 16 to the electron source 12. As a consequence, the target 20 is irradiated with the electron beam EB emitted from the electron source 12. The target 20 is excited in response to the electron beam EB and generates ultraviolet light UV.

Figure 2:
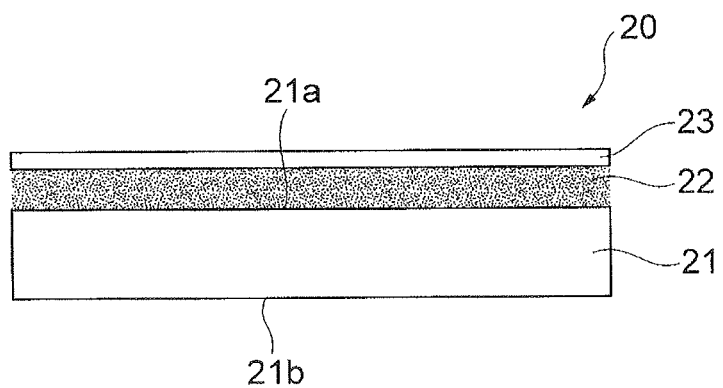
FIG. 2 is a side view illustrating a structure of a target for ultraviolet light generation.

FIG. 2 is a side view illustrating a structure of the target 20. As illustrated in FIG. 2, the target 20 comprises a substrate 21, a light-emitting layer 22 disposed on the substrate 21, and an aluminum film 23 provided on the light-emitting layer 22. The substrate 21 is a planar member made of a material adapted to transmit ultraviolet light therethrough, an example of which is constituted by sapphire ($Al_2O_3$), silica ($SiO_2$), or rock crystal (crystal of silicon oxide). The substrate 21 has a principal surface 21a and a rear face 21b. A preferred thickness of the substrate 21 is at least 0.1 mm but not more than 10 mm.

The light-emitting layer 22 is excited in response to the electron beam EB illustrated in FIG. 1 and generates the ultraviolet light UV. The light-emitting layer 22 includes a powdery or granular oxide crystal containing Lu and Si doped with an activator. Preferred examples of such an oxide crystal include $Lu_2Si_2O_7$ (LPS) and $Lu_2SiO_5$ (LSO) doped with a rare-earth element (Pr in an example) serving as an activator. As will be seen from examples to be explained later, a surface of the oxide crystal in the light-emitting layer 22 of this embodiment is covered with a melted crystal layer which is resolidified after being melted by heat treatment. The oxide crystal included in the light-emitting layer 22 may be any of a single crystal, a polycrystal, and their mixture. Different kinds of the oxide crystal (e.g., LPS and LSO) may be mixed.

Effects obtained by this embodiment will now be explained. When Lu- and Si-containing oxide crystals such as Pr:LPS and Pr:LSO crystals are utilized as a target for an electron-beam-excited ultraviolet light source, their polycrystalline plate states have conventionally been unpractical because of their too low transmittance for ultraviolet light and high cost. By contrast, as will be seen from examples to be explained later, it has been found out that turning an oxide crystal containing Lu and Si doped with an activator (Pr:LPS or Pr:LSO in an example) into a powdery or granular form and shaping it into a film can remarkably enhance the ultraviolet light generation efficiency as compared with the case using the planar oxide crystals mentioned above. It can also save the amount of materials for use, thereby achieving lower cost. This makes it possible to provide a target for ultraviolet light generation usable as a high output, highly stable ultraviolet light source in a wavelength region of 260-nm band useful for sterilization and analysis and as a large-area ultraviolet light source. Such actions seem to occur because turning the oxide crystal containing Lu and Si doped with an activator into a powdery or granular form increases both the reaction area between the oxide crystal and the electron beam and light extraction efficiency.

Preferably, as in this embodiment, the oxide crystal has a surface covered with a melted crystal layer resolidified after being melted by heat treatment. As will be seen from examples to be explained later, this fuses the oxide crystals to each other and the oxide crystal and the substrate 21 to each other, so as to enable the light-emitting layer 22 to attain sufficient mechanical strength without using binders, while enhancing the bonding strength between the light-emitting layer 22 and substrate 21, whereby the light-emitting layer 22 can be restrained from peeling.

Since the light-emitting layer 22 of this embodiment can be formed by such a method as depositing a powdery or granular oxide crystal on the substrate 21, the target 20 having a large area can be made easily.

The substrate 22 is preferably made of sapphire, silica, or rock crystal as in this embodiment. This enables the substrate 21 to transmit ultraviolet light therethrough and endure the temperature of heat treatment of the light-emitting layer 22 if any.

First Example

The first example of the above-mentioned embodiment will now be explained. First, in this example, a sapphire substrate having a diameter of 12 mm and a thickness of 2 mm was prepared. Subsequently, a Pr:LPS polycrystalline substrate was prepared, and this polycrystalline substrate was pulverized in a mortar, so as to turn the Pr:LPS polycrystal into a powdery or granular form. Then, the powdery or granular Pr:LPS polycrystal was deposited on the sapphire substrate by sedimentation, so as to form a light-emitting layer. Thereafter, an organic film (nitrocellulose) was formed on the light-emitting layer, and an aluminum film was vapor-deposited on the organic film. Finally, the light-emitting layer was fired, so as to decompose and vaporize the organic film, thus yielding a structure in which the aluminum film was in contact with the light-emitting layer. The thickness of the light-emitting layer after firing was 10 µm.

Figure 3:
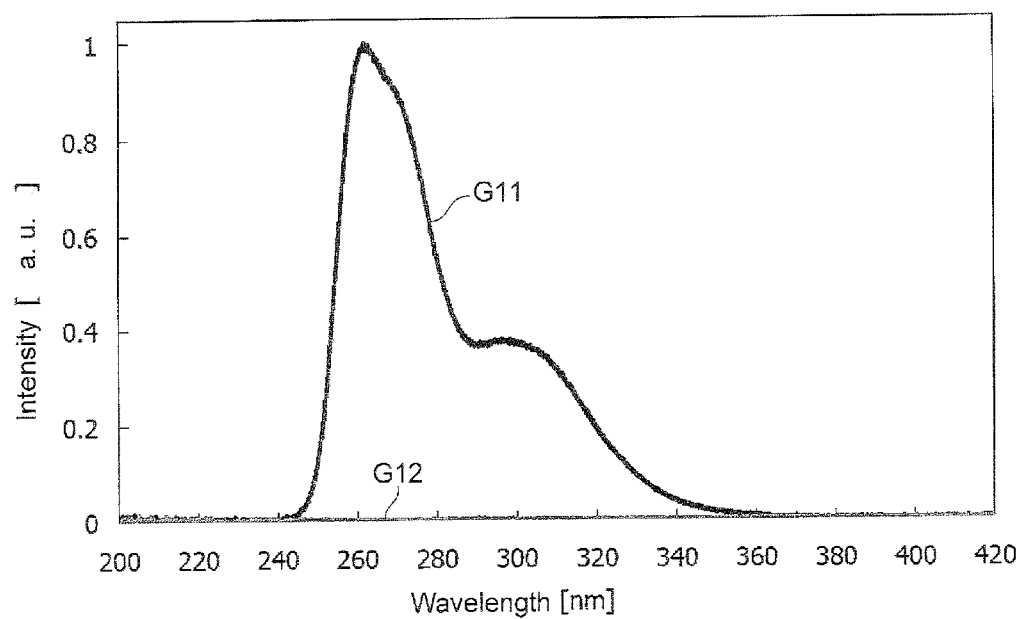
FIG. 3 is a graph illustrating a spectrum of ultraviolet light obtained by irradiating with an electron beam the target for ultraviolet light generation made by a first example.
Figure 4:
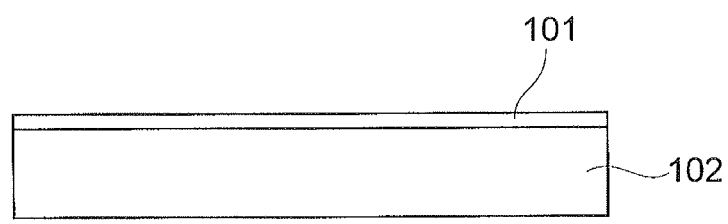
FIG. 4 is a diagram illustrating a Pr:LuAG monocrystal substrate having an aluminum film vapor-deposited on a surface thereof.

Graph G11 in FIG. 3 illustrates a spectrum of ultraviolet light obtained by irradiating with an electron beam the target made by this example. FIG. 3 also plots graph G12 for comparison. The graph G12 is a spectrum of ultraviolet light obtained by irradiating with an electron beam a Pr:LPS polycrystalline substrate 102 having an aluminum film 101 vapor-deposited on a surface as illustrated in FIG. 4. In the graphs G11 and G12, the electron beam had an acceleration voltage of 10 kV, an intensity (amperage) of 200 µA, and a diameter of 5 mm. As can be seen from FIG. 3, the peak intensity of ultraviolet light occurring upon irradiation with the electron beam is much greater (i.e., light emission efficiency is much higher) in the light-emitting layer of this example including the powdery or granular Pr:LPS polycrystal than in the Pr:LPS polycrystalline substrate. The light emission intensity of the Pr:LPS polycrystalline substrate is substantially zero over the whole wavelength region in FIG. 3 because the light-emitting layer is milky and does not transmit ultraviolet light therethrough. Since the Pr:LPS polycrystal is monoclinic, a polycrystalline substrate adapted to transmit ultraviolet light therethrough is hard to make.

Effects of turning a polycrystal into a powdery or granular form as mentioned above also seem to be obtained in activator-doped Lu- and Si-containing oxide crystals having a composition similar to that of the Pr:LPS polycrystal, e.g., Pr:LSO polycrystals, and single crystals without being restricted to the polycrystals.

Second Example

The second example of the above-mentioned embodiment will now be explained. This example will explain forming of a light-emitting layer with a binder and by heat treatment without binders.

Forming of a Light-Emitting Layer with a Binder

First, a sapphire substrate having a diameter of 12 mm and a thickness of 2 mm was prepared. Subsequently, a Pr:LPS polycrystalline substrate was prepared and pulverized in a mortar, so as to make a powdery or granular Pr:LPS polycrystal.

Then, the powdery or granular Pr:LPS polycrystal, deionized water, and an aqueous potassium silicate ($K_2SiO_3$) solution and an aqueous barium acetate solution as binder materials were mixed, the mixture was applied onto the sapphire substrate, and the Pr:LPS polycrystal and binder materials were deposited on the sapphire substrate by sedimentation, so as to form a light-emitting layer. Subsequently, an organic film (nitrocellulose) was formed on the light-emitting layer, and an aluminum film was formed by vacuum vapor deposition on the organic film. Finally, the light-emitting layer was fired in the air at 350° C., so as to decompose and vaporize the organic film, thus yielding a structure in which the aluminum film was in contact with the light-emitting layer.

Forming of a Light-Emitting Layer by Heat Treatment

First, a sapphire substrate having a diameter of 12 mm and a thickness of 2 mm was prepared. Subsequently, a Pr:LPS polycrystalline substrate was prepared and pulverized in a mortar, so as to make a powdery or granular Pr:LPS polycrystal.

The powdery or granular Pr:LPS polycrystal and a solvent (ethanol) were mixed, the resulting liquid mixture was applied onto the sapphire substrate, and then the solvent was dried. The Pr:LPS polycrystal was thus deposited on the sapphire substrate, so as to form a light-emitting layer. Subsequently, the light-emitting layer was heat-treated in an atmosphere under reduced pressure. The heat treatment was performed in order to melt a surface of the powdery or granular Pr:LPS polycrystal and yield a structure in which crystal particles were fused to each other and to a surface of the sapphire substrate, thereby enhancing the adhesion of the light-emitting layer. Thereafter, an organic film (nitrocellulose) was formed on the light-emitting layer, and an aluminum film was formed by vacuum vapor deposition on the organic film. Finally, the light-emitting layer was fired in the air at 350° C., so as to decompose and vaporize the organic film, thus yielding a structure in which the aluminum film was in contact with the light-emitting layer.

Figure 5:
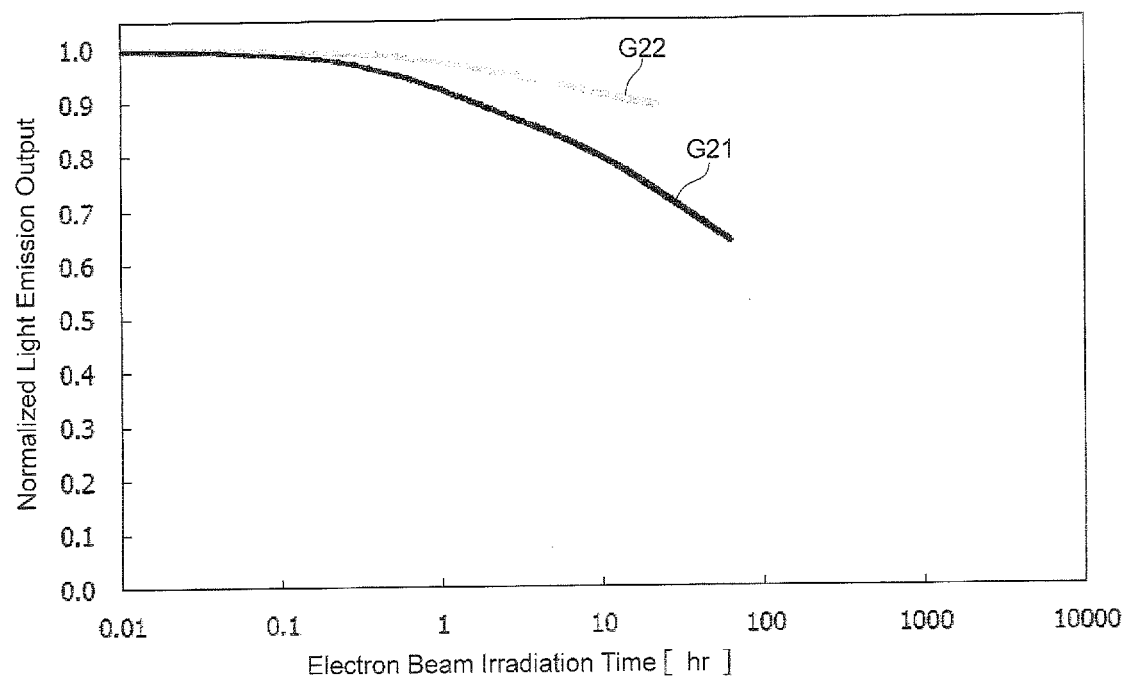
FIG. 5 is a graph illustrating changes with time of light emission intensity in a light-emitting layer formed with a binder and light emission intensity in a light-emitting layer formed by heat treatment.
Figure 6:
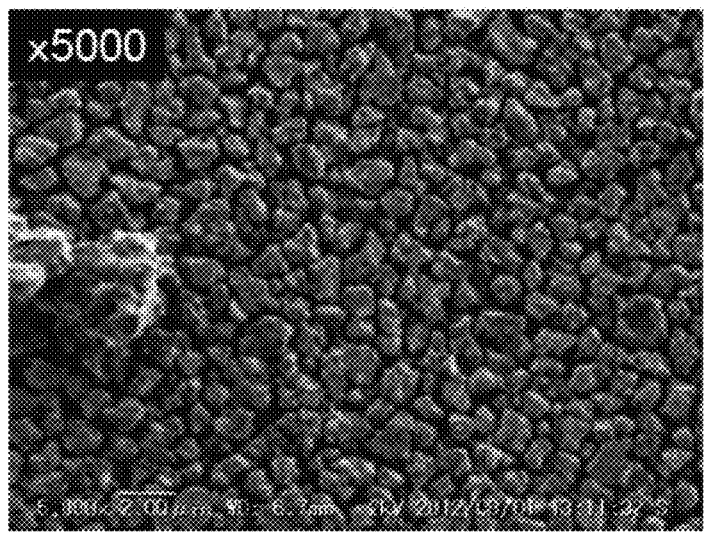
FIG. 6 is an electron microscope (SEM) photograph capturing a state of Pr:LPS crystal particles in a light-emitting layer.
Figure 6:
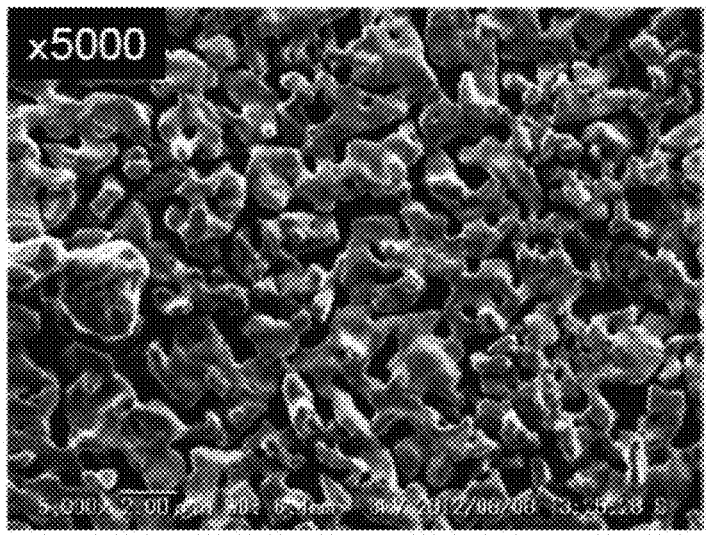
Figure 7:
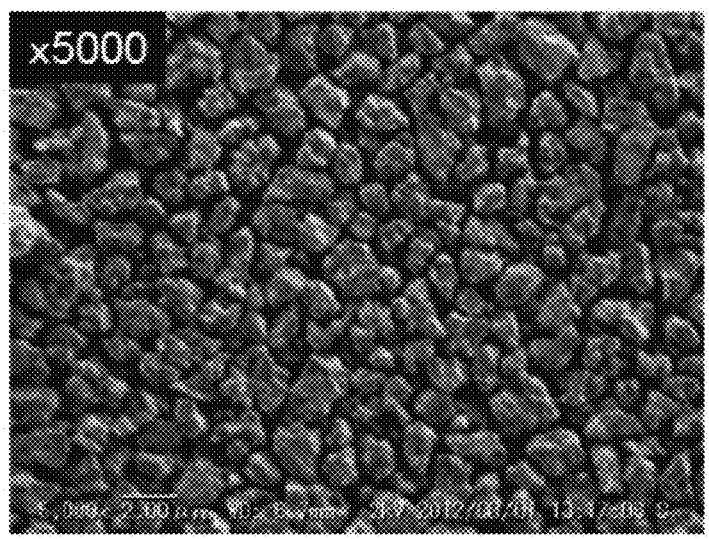
FIG. 7 is an electron microscope (SEM) photograph capturing a state of Pr:LPS crystal particles in a light-emitting layer.
Figure 7:
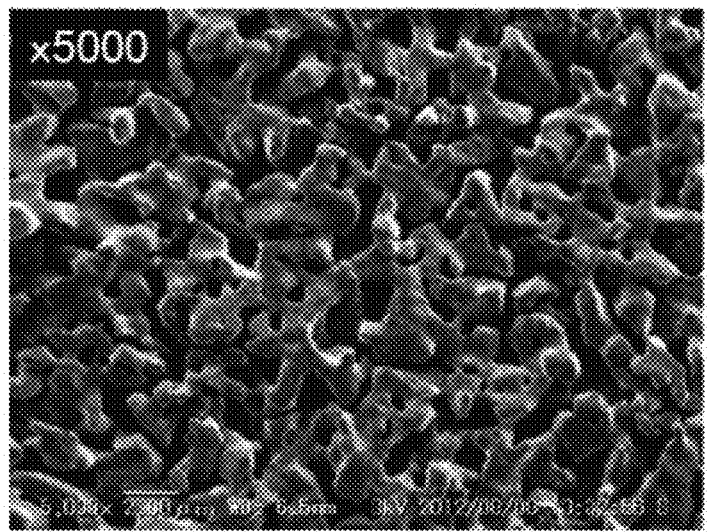
Figure 8:
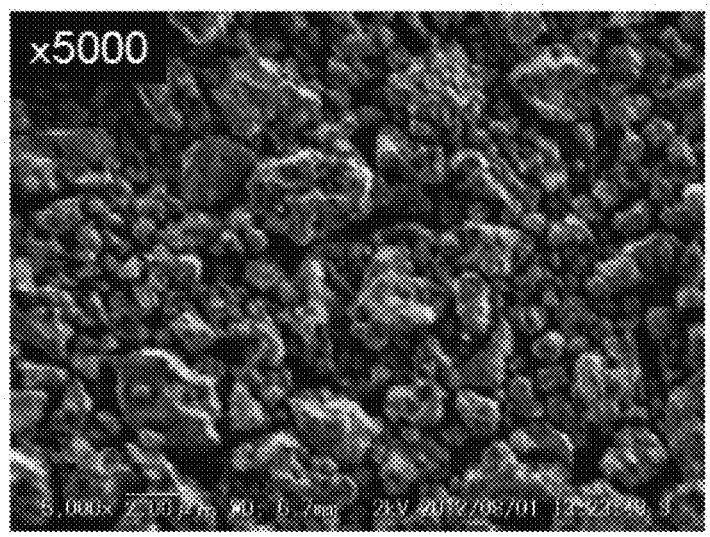
FIG. 8 is an electron microscope (SEM) photograph capturing a state of Pr:LPS crystal particles in a light-emitting layer.
Figure 8:
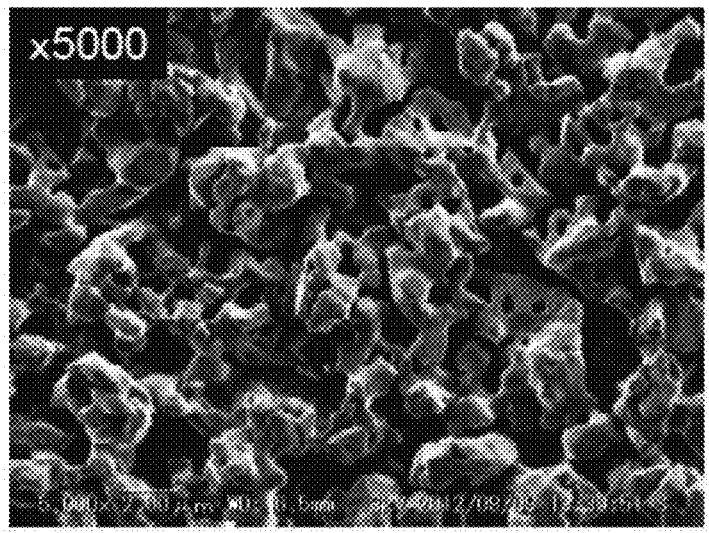
Figure 9:
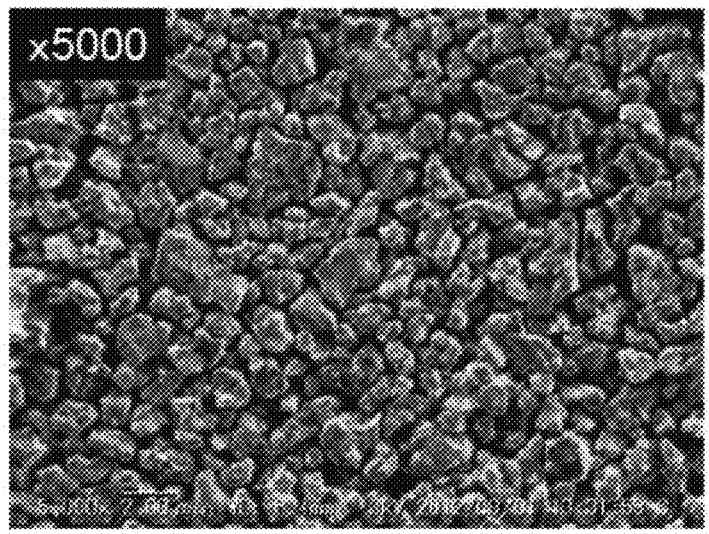
FIG. 9 is an electron microscope (SEM) photograph capturing a state of Pr:LPS crystal particles in a light-emitting layer.
Figure 9:
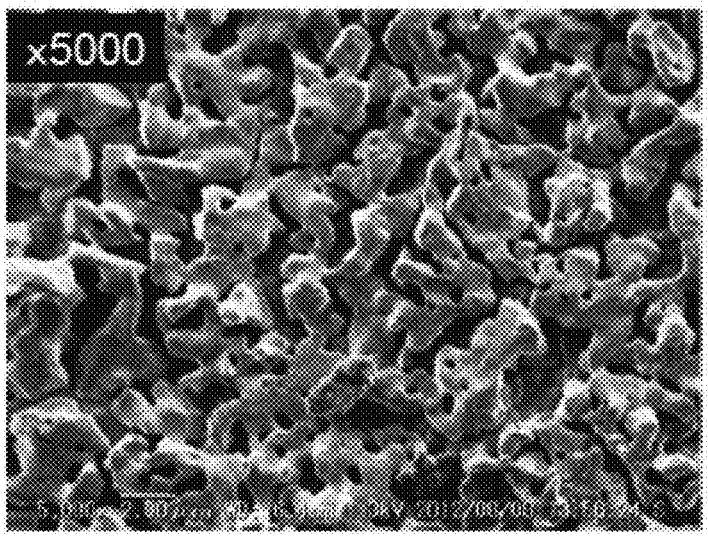

FIG. 5 is a graph illustrating changes with time of light emission intensity in the light-emitting layer formed with a binder and light emission intensity in the light-emitting layer formed by heat treatment. In FIG. 5, the ordinate indicates normalized light emission intensity (with an initial value of 1.0), while the abscissa indicates electron beam irradiation time (unit: hour) in logarithmic scale. Graphs G21 and G22 represent the light-emitting layer formed with the binder and the light-emitting layer formed by heat treatment (2 hr at 100° C.), respectively. In the graphs G21 and G22, the electron beam had an acceleration voltage of 10 kV and an intensity (amperage) of 20 μA.

As illustrated in FIG. 5, the change with time of light emission intensity (decrease in light emission intensity) was smaller in the case of forming the light-emitting layer by heat treatment without binders (graph G22) than in the case with a binder (graph G21). Specifically, the light output maintenance ratio after 10 hr (the ratio of the light output intensity after 10 hr to the light output intensity immediately after starting) was 91.1% in the heat-treated light-emitting layer but 79.4% in the light-emitting layer with the binder. This seems to be because of the following reason. When a light-emitting layer is formed with a binder, the finished light-emitting layer contains a binder material in addition to the Pr:LPS crystal. Irradiating this light-emitting layer with an electron beam having high energy raises its temperature and generates X-rays, whereby the binder material denatures and decomposes under the influence of high temperature and X-rays. It seems that the denatured binder material attached to the crystal surface absorbs ultraviolet light from the crystal, thereby lowering the quantity of light radiated to the outside.

When formed by heat treatment, by contrast, the light-emitting layer contains no binder material, so that no binder material denatures and decomposes, whereby the transmittance for ultraviolet light seems to be maintained for a relatively long time. Therefore, it is desirable for the light-emitting layer to be formed by heat treatment.

FIGS. 6 to 9 are electron microscope (SEM) photographs capturing states of Pr:LPS polycrystalline particles in a light-emitting layer. In these photographs, (a) illustrates a state before heat treatment, while (b) illustrates a state after heat treatment (1500° C., 2 hr) at the same location as (a).

It is seen from FIGS. 6 to 9 that the heat-treated Pr:LPS polycrystalline particles have their surfaces resolidified after being melted as compared with those before heat treatment. In other words, melted crystal layers resolidified after being melted by heat treatment cover surfaces of the Pr:LPS polycrystalline particles in the heat-treated light-emitting layer. The melted crystal layers of the Pr:LPS polycrystalline particles adjacent to each other fuse together, so that the Pr:LPS polycrystalline particles are firmly joined to each other, whereby the mechanical strength of the light-emitting layer can be enhanced without using the above-mentioned binder.

Figure 10:
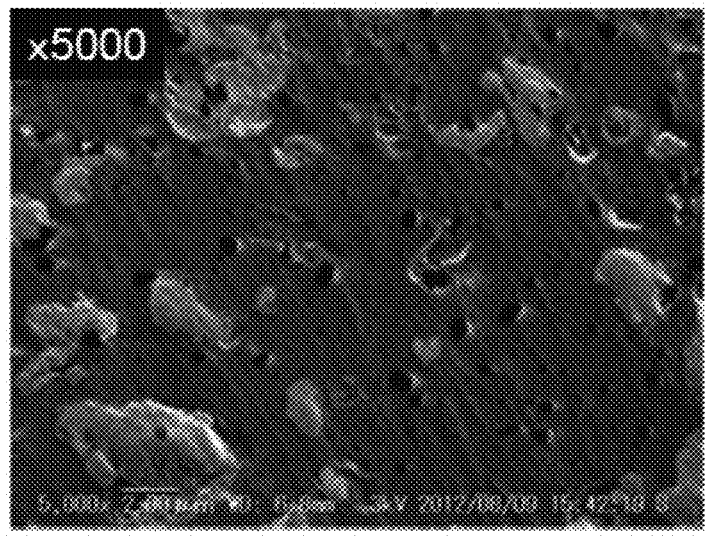
FIG. 10 is an electron microscope (SEM) photograph capturing a surface of a sapphire substrate after peeling a light-emitting layer.
Figure 10:
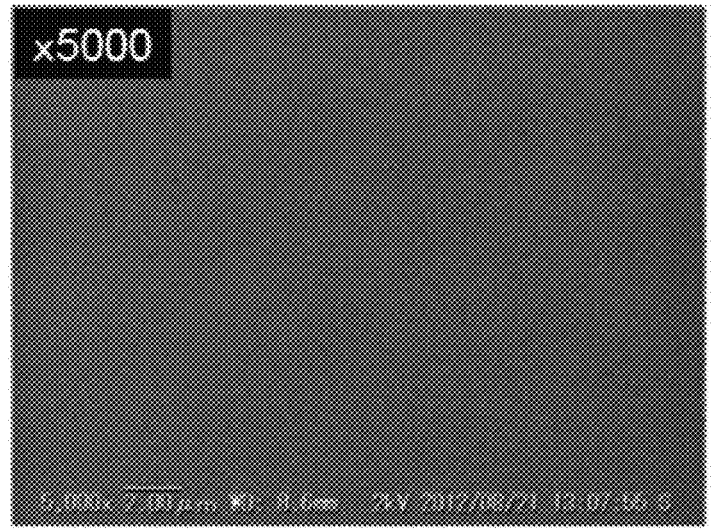
Figure 11:
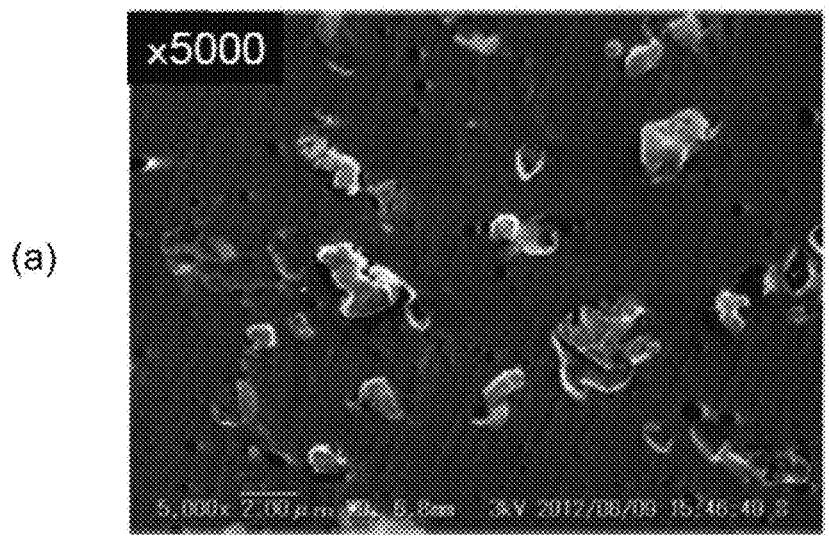
FIG. 11 is an SEM photograph capturing a surface of a sapphire substrate after peeling a light-emitting layer.
Figure 11:
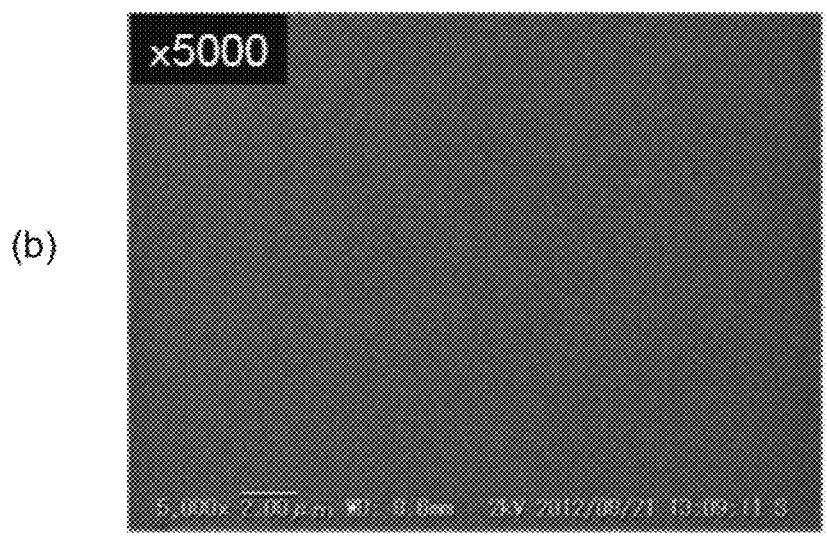

The above-mentioned melted crystal layers also contribute to binding the Pr:LPS polycrystalline particles and the substrate to each other. FIGS. 10 and 11 are electron microscope (SEM) photographs each capturing a surface of a sapphire substrate after peeling a light-emitting layer. In these photographs, (a) illustrates a state where a light-emitting layer formed by heat treatment is peeled, while (b) illustrates a state where a light-emitting layer (not heat-treated) formed with a binder is peeled. In this example, the light-emitting layers were removed by strongly rubbing them with Bemcot (registered trademark).

It is seen from FIGS. 10(a) and 11(a) that peeling the light-emitting layer formed by heat treatment cannot completely remove the Pr:LPS polycrystal but leaves melted crystal layers of the Pr:LPS polycrystal on the surface of the sapphire substrate. On the other hand, it is seen from FIGS. 10(b) and 11(b) that peeling the light-emitting layer (not heat-treated) formed with a binder can completely remove the Pr:LPS polycrystal, so that only the surface of the sapphire substrate is photographed. It is inferred from these SEM photographs that, in the light-emitting layer formed by heat treatment, the melted crystal layers fuse to the substrate surface, so that the Pr:LPS polycrystalline particles and the substrate are joined together more firmly, whereby the light-emitting layer is inhibited from peeling.

Effects of heat-treating a powdery or granular polycrystal as mentioned above also seem to be obtained in activator-doped Lu- and Si-containing oxide crystals having a composition similar to that of the Pr:LPS polycrystal, e.g., Pr:LSO polycrystals, and single crystals without being restricted to the polycrystals.

The heat treatment temperature for the light-emitting layer, which is 1500° C. in this example, is preferably at least 1000° C. and preferably not higher than 2000° C. The heat treatment temperature of at least 1000° C. makes it possible to form a melted crystal layer with a sufficient thickness on a crystal particle surface and enhance the adhesion between crystal particles and between the crystal particles and substrate, thereby effectively preventing the light-emitting layer from peeling upon electron beam irradiation. The heat treatment temperature not higher than 2000° C. can prevent the crystal structure from changing, thereby preventing the light emission efficiency from lowering. It can also keep substrates (sapphire substrates in particular) from deforming.

Figure 12:
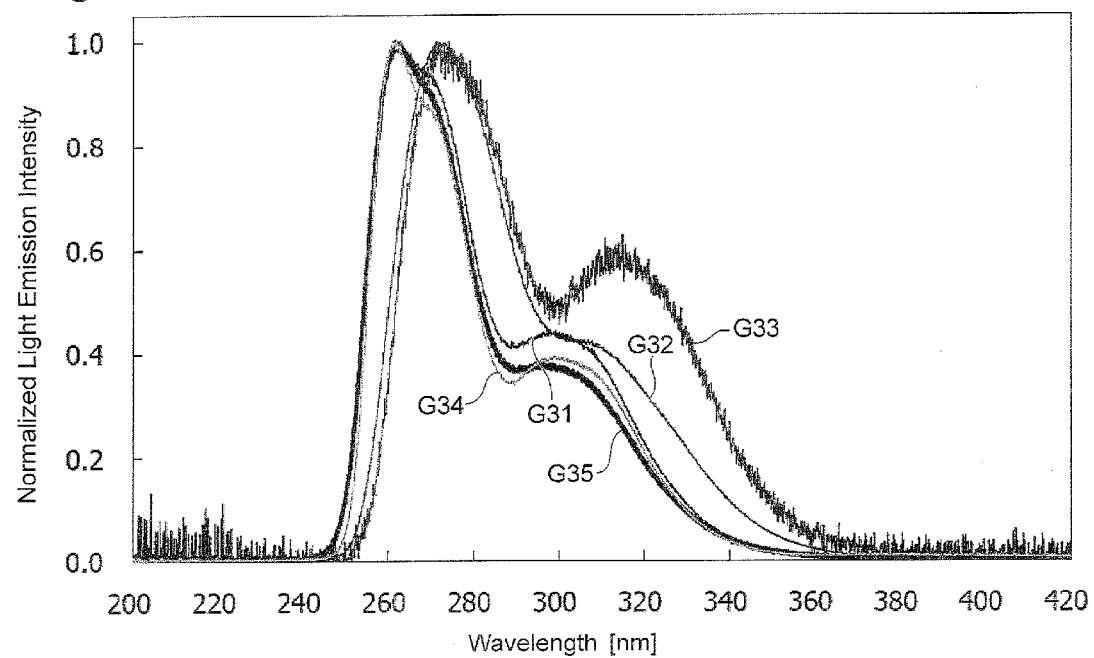
FIG. 12 is a graph illustrating, for each of targets for ultraviolet light made under various conditions for heat treatment of light-emitting layers, a spectrum of ultraviolet light obtained by irradiation with an electron beam.

Graphs G31 to G34 plotted in FIG. 12 represent spectra of ultraviolet light obtained by irradiating with an electron beam targets for ultraviolet light generation made under the following heat treatment conditions for their light-emitting layers:
Graph G31: 1000° C., 2 hr in vacuum
Graph G32: 1400° C., 2 hr in vacuum
Graph G33: 1500° C., 2 hr in vacuum
Graph G34: 1400° C., 2 hr in atmosphere
FIG. 12 also plots Graph G35 for comparison. Graph G35 represents a spectrum of ultraviolet light obtained by irradiating with an electron beam a target for ultraviolet light generation having a light-emitting layer formed with a binder. In these graphs G31 to G35, the electron beam had an acceleration voltage of 10 kV, an intensity (amperage) of 200 μA, and a diameter of 5 mm. In FIG. 12, the ordinate indicates normalized light emission intensity (with an initial value of 1.0), while the abscissa indicates wavelength (unit: nm). It is seen from FIG. 12 that the peak wavelength of ultraviolet emission varies depending on the temperature and atmosphere at the time of heat treatment.

That is, while there is only one and fixed kind of light emission spectrum in the case with a binder (no heat treatment), the light emission wavelength can be altered by changing the atmosphere/temperature of heat treatment in the case with no binder (with heat treatment). That is, changing heat treatment conditions makes it possible to choose an optimal wavelength suitable for a use.

The target for ultraviolet light generation, electron-beam-excited ultraviolet light source, and method for manufacturing a target for ultraviolet light generation in accordance with one aspect of the present invention are not limited to the embodiment mentioned above, but can be modified in various ways. For example, the aluminum film, which is vapor-deposited on the light-emitting layer in each of the above-mentioned embodiment and examples, may be omitted. The aluminum film functions as an antistatic conductive film, for which conductive films made of materials other than aluminum may also be used.

INDUSTRIAL APPLICABILITY

The target for ultraviolet light generation, electron-beam-excited ultraviolet light source, and method for manufacturing a target for ultraviolet light generation in accordance with one aspect of the present invention can enhance ultraviolet light generation efficiency.

REFERENCE SIGNS LIST

10: electron-beam-excited ultraviolet light source; 11: envelope; 12: electron source; 13: extraction electrode; 16: power supply part; 20: target for ultraviolet light generation; 21: substrate; 21a: principal surface; 21b: rear face; 22: light-emitting layer; 23: aluminum film; EB: electron beam; UV: ultraviolet light.

The invention claimed is:

1. A target for ultraviolet light generation comprising:
    a substrate adapted to transmit ultraviolet light therethrough; and
    a light-emitting layer disposed on the substrate and generating ultraviolet light in response to an electron beam;
    wherein the light-emitting layer includes a powdery or granular oxide crystal containing Lu and Si doped with an activator, and
    wherein the oxide crystal has a surface covered with a melted crystal layer resolidified after being melted by heat treatment.

2. A target for ultraviolet light generation according to claim 1, wherein the melted crystal layer fuses the oxide crystals to each other and to the substrate.

3. A target for ultraviolet light generation according to claim 1, wherein the oxide crystal includes at least one of $Lu_2Si_2O_7$ (LPS) and $Lu_2SiO_5$ (LSO).

4. A target for ultraviolet light generation according to claim 3, wherein the activator is Pr.

5. A target for ultraviolet light generation according to claim 1, wherein the substrate is constituted by sapphire, silica, or rock crystal.

6. An electron-beam-excited ultraviolet light source comprising:
    the target for ultraviolet light generation according to claim 1; and
    an electron source providing the target with the electron beam.

7. A method for manufacturing a target for ultraviolet light generation, the method comprising depositing a powdery or granular oxide crystal containing Lu and Si doped with an activator on a substrate adapted to transmit ultraviolet light therethrough and heat-treating the oxide crystal, so as to melt and then resolidify a surface of the oxide crystal to form a melted crystal layer.

8. A method for manufacturing a target for ultraviolet light generation according to claim 7, wherein the heat-treatment temperature is at least 1000° C. but not higher than 2000° C.

* * * * *